(12) United States Patent
Moberg et al.

(10) Patent No.: US 8,861,474 B2
(45) Date of Patent: *Oct. 14, 2014

(54) PROHIBITING UNNECESSARY SCHEDULING REQUESTS FOR UPLINK GRANTS

(71) Applicant: Telefonaktiebolaget L M Ericsson (publ), Stockholm (SE)

(72) Inventors: Peter Moberg, Stockholm (SE); Henrik Enbuske, Stockholm (SE); Eva Englund, Linköping (SE); Magnus Lindström, Spånga (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,502

(22) Filed: Oct. 9, 2013

(65) Prior Publication Data

US 2014/0036885 A1    Feb. 6, 2014

Related U.S. Application Data

(63) Continuation of application No. 12/933,807, filed as application No. PCT/SE2009/050284 on Mar. 19, 2009, now Pat. No. 8,582,514.

(60) Provisional application No. 61/038,621, filed on Mar. 21, 2008.

(51) Int. Cl.
*H04W 4/00* (2009.01)
*H04W 72/12* (2009.01)

(52) U.S. Cl.
CPC ...... *H04W 72/1284* (2013.01); *H04W 72/1242* (2013.01)

USPC .......................................................... 370/329

(58) Field of Classification Search
None
See application file for complete search history.

(56) References Cited

U.S. PATENT DOCUMENTS 7,961,752 B2    6/2011  Parkvall et al.
8,094,671 B2 *  1/2012  Iwamura et al. ............. 370/439
(Continued)

FOREIGN PATENT DOCUMENTS

WO    2004/061638    7/2004
WO    2006/067556    6/2006
WO    2006/118427    11/2006

OTHER PUBLICATIONS

International Search Report for PCT/SE2009/050284, mailed Sep. 23, 2009.

(Continued)

*Primary Examiner* — Anh-Vu Ly
(74) *Attorney, Agent, or Firm* — Baker Botts, LLP

(57) ABSTRACT

Uplink transmission scheduling requests (SRs) may be prohibited for a lower priority data flow, logical channel group (e.g., VoIP configured with semi-persistent resource allocation), or other grouping but may still be triggered for higher priority traffic (e.g., data connected to a signaling radio bearer (SRB)). More efficient scheduling is also achieved by allowing an uplink transmission scheduler to distinguish between different priority flows or groups (e.g., LCGs) without a buffer status report (BSR). As a result, when a semi-persistent resource is scheled for the lower priority data, there is less delay for high priority data while eliminating uplink and downlink control signaling, i.e., fewer scheduling requests (SRs) and uplink grants, for the lower priority data.

19 Claims, 6 Drawing Sheets

(56) References Cited

U.S. PATENT DOCUMENTS

| | | | |
|---|---|---|---|
| 8,243,660 B2* | 8/2012 | Jeong et al. | 370/329 |
| 8,582,514 B2* | 11/2013 | Moberg et al. | 370/329 |
| 2002/0093930 A1 | 7/2002 | Dertz et al. | |
| 2004/0209643 A1 | 10/2004 | Welsh | |
| 2006/0133313 A1* | 6/2006 | You et al. | 370/329 |
| 2006/0274690 A1 | 12/2006 | Chun | |
| 2007/0121542 A1* | 5/2007 | Lohr et al. | 370/329 |
| 2008/0004058 A1 | 1/2008 | Jeong et al. | |
| 2008/0214200 A1 | 9/2008 | Grandblaise et al. | |
| 2009/0003282 A1 | 1/2009 | Meylan et al. | |
| 2010/0098011 A1* | 4/2010 | Pelletier et al. | 370/329 |
| 2012/0020303 A1* | 1/2012 | Barber et al. | 370/328 |
| 2012/0275418 A1* | 11/2012 | Jeong et al. | 370/329 |
| 2013/0308574 A1* | 11/2013 | Jeong et al. | 370/329 |

OTHER PUBLICATIONS

International Preliminary Report on Patentability mailed Sep. 30, 2010 in corresponding PCT Application No. PCT/SE2009/050284.
3GPP TS 36.201 V8.0.0 (Sep. 2007) Technical Specification; 3rd Generation Partnership Project; Technical Specification Group Radio Access Network; Evolved Universal Terrestrial Radio Access (E-UTRA); Long Term Evolution (LTE) physical layer; General description (Release 8).
3GPP TS 36.321 V8.0.0 (Dec. 2007) Technical Specification; 3rd Generation Partnership Project; Technical Specification Group Radio Access Network; Evolved Universal Terrestrial Radio Access (E-UTRA) Medium Access Control (MAC) protocol specification (Release 8).
R2-081016, 3GPP meeting Sorrento, "Triggering of SR in relation to allocated UL grants", Ericsson; Sorrento, Italy, Feb. 11-15, 2008.
New Zealand Examination Report issued in Patent Application No. 587827 dated Mar. 8, 2012.
"Triggering of SR in Relation to Allocated Uplink Grants," 3GPP TSG-RAN WG2 #61, Tdoc R2-081016, Feb. 11-15, 2008, http://www.3gpp.org/ftp/tsg_ran/WG2_RL2/TSGR2_61/Docs/R2-081016.zip.
"Persistent Scheduling for UL," 3GPP TSG-RAN WG2 Meeting #60bis, R2-080019, Jan. 14-18, 2008, http://www.3gpp.org/ftp/tsg_ran/WG2_RL2/TSGR2_60bis/Docs/R2-080019.zip.
Japanese Office Action issued in Application Serial No. 2011-500739 dated Apr. 22, 2013.

* cited by examiner

PROHIBITING UNNECESSARY SCHEDULING REQUESTS FOR UPLINK GRANTS

This application is a continuation of U.S. patent application Ser. No. 12/933,807 filed Sep. 21, 2010, which is the U.S. national phase of International Application No. PCT/SE2009/050284, filed 19 Mar. 2009, which designated the U.S. and claims priority to U.S. Application No. 61/038,621, filed 21 Mar. 2008, the entire contents of which are hereby incorporated by reference.

TECHNICAL FIELD

The technology pertains to the field of telecommunications, and particularly, to uplink scheduling for wireless communications terminals.

BACKGROUND

In the 3rd Generation Partnership Project (3GPP) standardization body, technologies like GSM, HSPA, and LTE have been and are currently developed for cellular communication networks that are providing higher data rates together with improved capacity and coverage. In LTE, the access technology is based on Orthogonal Frequency Division Multiplexing (OFDM) for the downlink (DL) and Single Carrier FDMA (SC-FDMA) for the uplink (UL). Radio resource allocation to user equipments (UEs) on both the downlink (DL) and the uplink (UL) is performed adaptively using "fast scheduling" taking into account the current traffic pattern and radio propagation characteristics associated with each UE. Assigning radio resources in both the DL and UL is performed in the scheduler situated in the base station which is referred to in LTE as an eNodeB.

The technology in this application is related to UL scheduling in LTE and in systems that employ uplink scheduling similar to LTE. One of the challenges in assigning resources for UL transmissions is that the UE must make the eNodeB aware that there is data pending or waiting in the UE buffer for UL transmission. One way to do this in LTE for example is for the UE to transmit a scheduling request (SR) to the eNodeB. The SR can be sent on a dedicated SR channel (D-SR) or on a contention based Random Access Channel (RACH). A D-SR requires that the UE be UL-synchronized and that the UE has been assigned a SR channel on the Physical Uplink Control Channel (PUCCH). Both of these procedures result in delay. Then, the eNodeB responds with a grant including information on what time/frequency resources the UE will use for the UL transmission. The grant is sent on the Physical Downlink Control Channel (PDCCH). With support from the link adaptation function in the eNodeB, the transport block size, modulation, coding, and antenna scheme are selected, and the selected transport format is signaled together with user ID information to the UE.

The resource granted by the eNodeB can be of variable size so that the UL transmission that follows from the UE can contain various numbers of bits. At a minimum, the UL transmission should include a buffer status report (BSR). Other information may be included along with the BSR.

Sending a scheduling request (SR) informs the eNodeB uplink scheduler of the UE's need for UL transmission resources. In LTE, triggering a scheduling request (SR) is related to the different logical channels in LTE. Those logical channels are normally grouped together into logical channel groups (LGC) that share similar characteristics. More specifically, a transmission of a buffer status report (BSR) is triggered when UL data arrives in the UE transmission buffer and that data belongs to a logical channel group (LCG) with a higher priority than the priority for data already existing in the UE transmission buffer. In turn, a scheduling request (SR) is triggered if the UE does not have an UL resource allocated for the current transmission time period. A dedicated scheduling request (SR) (D-SR) is transmitted on the PUCCH if this resource is allocated to the UE, or alternatively, a random access scheduling request (SR) (RA-SR) is transmitted on the RACH.

LTE also offers the opportunity to use semi-persistent scheduling in which a UE is allocated an UL resource with some periodicity. A benefit of semi-persistent scheduling is that it saves scarce radio resources on the Physical Downlink Control Channel (PDCCH) by avoiding the transmission of UL grants for every resource allocation. One service likely to benefit from a semi-persistent scheduling configuration is voice over IP (VoIP). When a UE has an UL semi-persistent radio resource configured for a VoIP flow or the like, each packet arriving to an empty buffer triggers a RA-SR or a D-SR unless the timing of the resource is perfectly aligned with the arrival of the VoIP data. In other words, there will likely be many instances when each packet arriving to an empty buffer triggers a RA-SR or a D-SR even though a SR is unnecessary given the semi-persistent scheduling of UL resource for the VoIP flow.

In this situation, the UL scheduler cannot distinguish between an RA-SR or a D-SR triggered (1) by a VoIP frame (that typically does not need the scheduler to respond to the SR because the semi-persistent scheduling already has a resource ready for the VoIP frame in the near future) or (2) by some higher priority data (e.g. related to a signaling radio bearer (SRB) which does need the scheduler to respond to the SR). The scheduler either ignores all SRs from the UE or schedules the UE dynamically for all SRs. In the first case, the transmission of higher priority data, like signaling radio bearer (SRB) data, might be delayed until the next semi-persistent resource comes up. If the delayed higher priority data takes the next semi-persistent resource, then the buffered, lower priority VoIP data is delayed until the next semi-persistent grant comes along. If VoIP frames are bundled, extra delay time could be 40 ms or more, which may be unacceptable. In the second case, there is not much benefit from using semi-persistent resource scheduling because both PDCCH grants and SRs will be sent extensively regardless.

SUMMARY

A method and apparatus for uplink communications from a wireless terminal to a network over a radio interface are disclosed. Data to be transmitted by the wireless terminal to the network is detected to trigger a scheduling request to the network for an uplink transmission. A priority associated with the detected data is determined. An uplink transmission scheduling request is transmitted to the network if the determined priority is a first priority. Transmission of an uplink transmission scheduling request to the network is delayed or not transmitted if the determined priority is a second different priority. The second priority data corresponds to a data flow configured not to send a scheduling request. In a preferred example, the first priority is higher than the second priority.

The priority may be associated with one or more of a logical channel, a logical channel group, a radio bearer, a quality of service, or a buffer status report associated with the data. The first priority data may be delay-sensitive data and the second priority data voice over IP (VOW) data.

A further aspect of the technology allows a determination that a future uplink radio resource is scheduled for use by the wireless terminal. In that case, the data is transmitted using the future uplink radio resource when the determined priority is the second priority.

Another aspect of the technology starts a timer having a predetermined timer value associated with the second priority when the time remaining to the future uplink radio resource equals the predetermined timer value. If the timer times out prior to the data being transmitted, the uplink transmission scheduling request is transmitted to the network. The future uplink radio resource may be semi-persistently scheduled at periodic time intervals. Moreover, the timer value may be the same as or less than the periodic time interval. In one example embodiment, a timer may be started having a timer value associated with the first priority when the data with the first priority is detected. The timer value associated with the first priority is less than the timer value associated with the second priority. If the timer times out prior to the data being transmitted, the uplink transmission scheduling request is transmitted to the network.

The wireless terminal typically stores data in a data flow to be transmitted to the network in a buffer. The wireless terminal detects when an empty buffer has received data for transmission. If the detected data is associated with the first priority, a buffer status report (BSR) is generated and sent to the network. When an uplink scheduling grant is received from the network, the data with the first priority and the buffer status report are transmitted to the network. If the detected data is associated with the second priority, then a buffer status report is not transmitted to the network until an uplink resource is available to transmit the detected data associated with the second priority.

Apparatus in accordance with the above is described for use in a wireless terminal for communicating with a network over a radio interface. A base station for use with the wireless terminal includes an uplink transmissions scheduler that receives and grants scheduling requests and receives data transmitted using the uplink grant. A radio communications system is also provided that includes the wireless terminal and the base station.

Accordingly, scheduling requests (SRs) can be prohibited for a lower priority data flow, logical channel group (e.g., VoIP configured with semi-persistent resource allocation), or other grouping but still be triggered for higher priority traffic (e.g., data associated with a signaling radio bearer (SRB)). This enables more efficient scheduling since the scheduler can distinguish between different priority flows or groups (e.g., LCGs) without waiting for a buffer status report (BSR), which also means that the UL scheduler, e.g., can choose to allocate a resource with robust coding and modulation in case the data is regarded as sensitive. Another advantageous result is less delay for delay sensitive, high priority data and reduced uplink and downlink control signaling (i.e., fewer SRs and uplink grants) when a semi-persistent resource is scheduled.

DETAILED DESCRIPTION

In the following description, for purposes of explanation and not limitation, specific details are set forth such as particular architectures, interfaces, techniques, etc. However, it will be apparent to those skilled in the art that the claimed technology may be practiced in other embodiments that depart from these specific details. That is, those skilled in the art will be able to devise various arrangements which, although not explicitly described or shown herein, embody the principles of the claimed technology and are included within its spirit and scope. In some instances, detailed descriptions of well-known devices, circuits, and methods are omitted so as not to obscure the description of the present invention with unnecessary detail. All statements herein reciting principles, aspects, and embodiments, as well as specific examples thereof, are intended to encompass both structural and functional equivalents thereof Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated various processes described may be substantially represented in computer-readable medium and so executed by a computer or processor.

The functions of the various elements including functional blocks labeled or described as "processors" or "controllers" may be provided through the use of dedicated hardware as well as hardware capable of executing software. When provided by a processor, the functions may be provided by a single dedicated processor, by a single shared processor, or by a plurality of individual processors, some of which may be shared or distributed. Moreover, a "processor" or "controller" may include, without limitation, digital signal processor (DSP) hardware, ASIC hardware, read only memory (ROM), random access memory (RAM), and/or other storage media.

This description focuses on a radio communication system according to the LTE standards, but the technology in general covers other wireless communication systems that employ uplink scheduling procedures.

Figure 1:
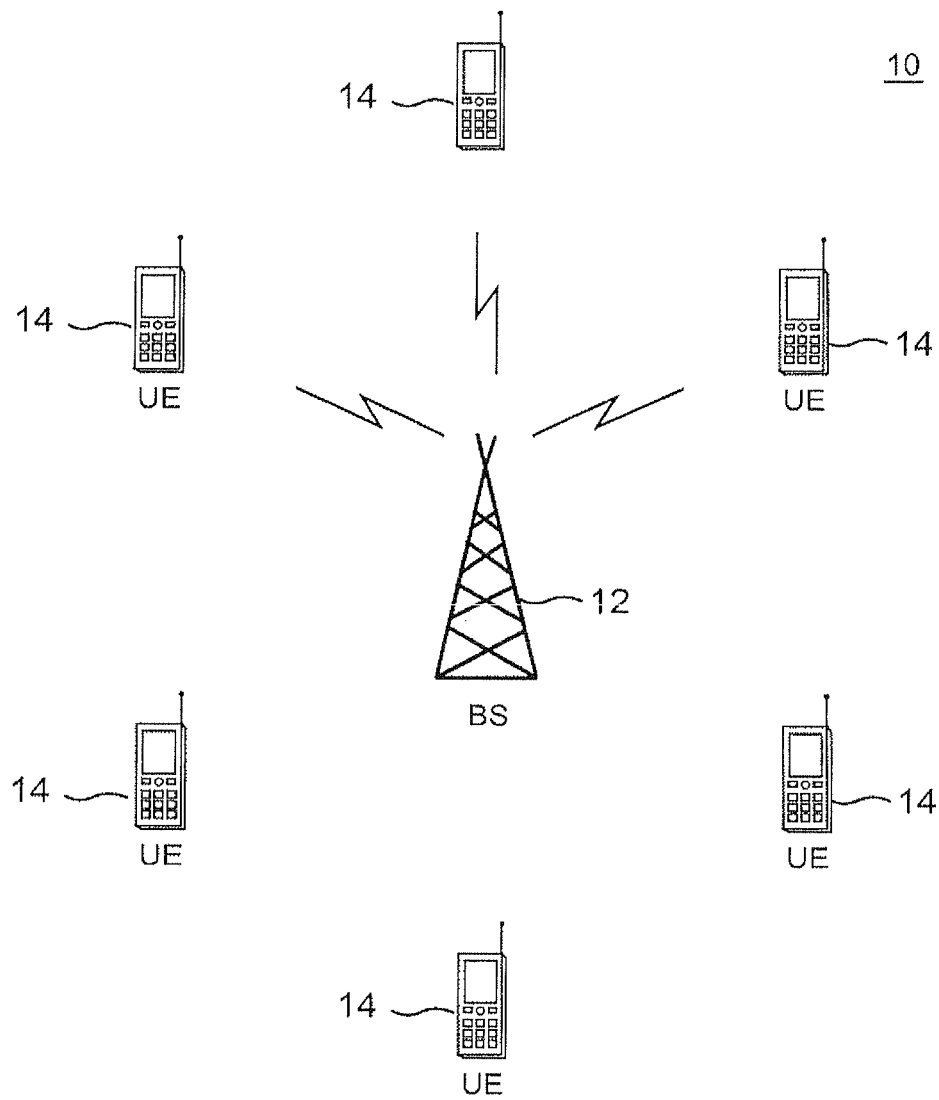
FIG. 1 depicts an example of a radio communications system.

FIG. 1 is an illustration that depicts an example of a radio communications system 10. A radio base station 12 transmits information in a downlink direction over a radio interface to multiple user equipments (UEs) 14 also referred to as wireless terminals, mobile radios, mobile stations, etc. In the uplink direction, the UEs 14 can transmit information over the radio interface to the base station. The base station is typically part of a radio access network that may include other multiple base stations. The radio access network is usually coupled to other networks that facilitate communication with users via the interne, public telephone network, and the like.

As described in the background, base station 12 includes a scheduler that schedules transmissions from the UEs 14 by following a certain communications protocol where each active UE requests uplink radio resources from the base station scheduler to transmit data in the uplink direction, and the base station scheduler typically responds by providing an uplink grant of radio resources to requesting UE 14, assuming those resources are available.

Figure 2:
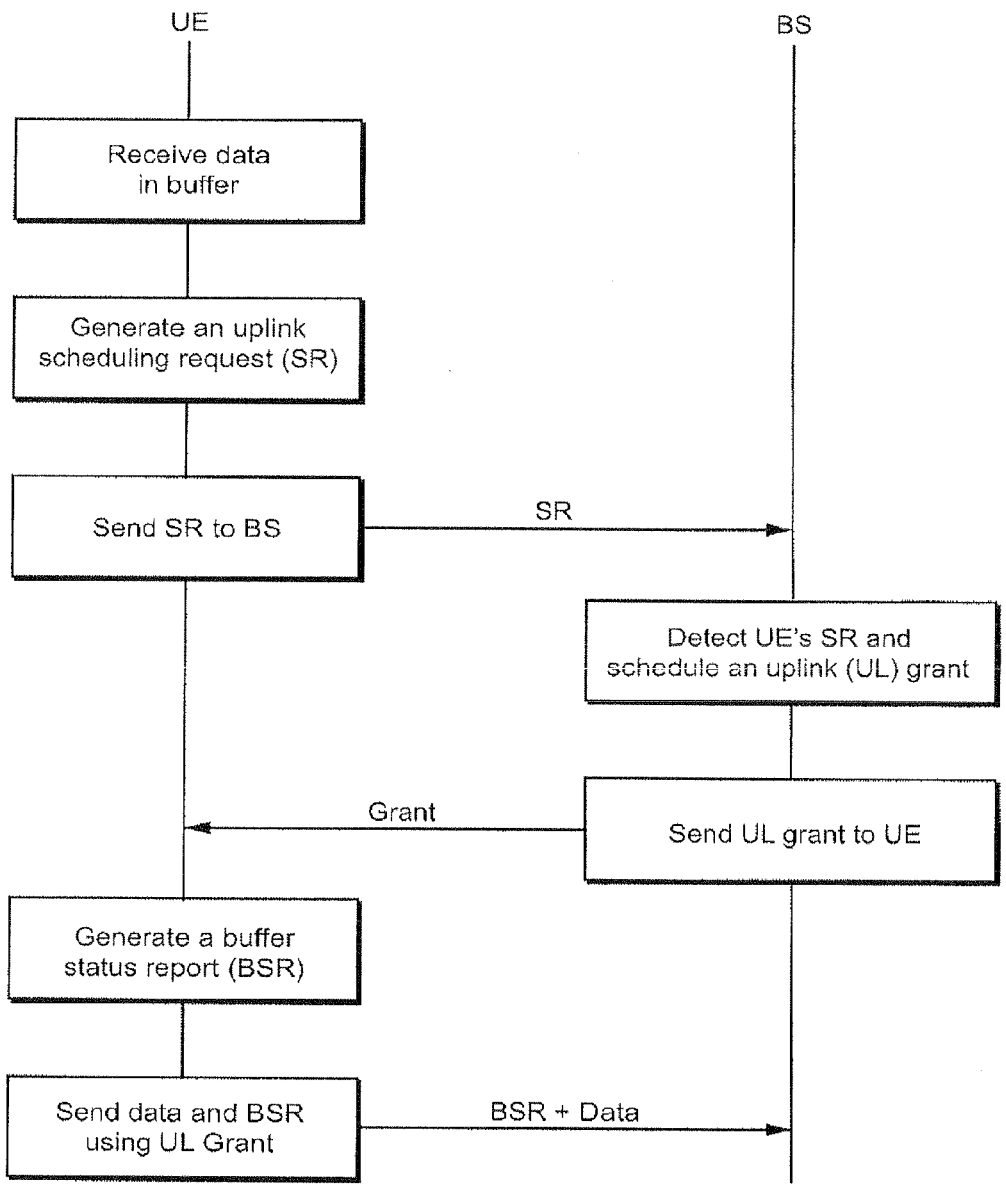
FIG. 2 is an example signaling diagram showing procedures associated with an uplink scheduling request.

FIG. 2 is an example signaling diagram showing non-limiting example procedures associates with an uplink scheduling request. The UE is shown on the left side of the figure, and the base station (BS) is shown on the right side. Initially, the UE receives uplink data for transmission in a transmission buffer. In response to receipt of that data in the buffer, the UE generates an uplink scheduling request (SR), and sends that scheduling request to the base station. The base station detects that UE's scheduling request, and in response, schedules an uplink grant of radio resources for the UE to use, and then sends that uplink grant to the UE. Upon receiving the uplink grant from the base station, the UE generates a buffer status report (BSR) and sends the buffered data along with the buffer status report using the uplink grant to the base station. Because the BSR triggers the SR, so there is always a BSR ready for transmission following the transmission of a SR. But the BSR can be cancelled if the UL resource can fit all the data (but not the BSR); otherwise, the BSR is sent together with data if there is room.

This procedure for scheduling uplink transmissions requires a certain amount of data processing overhead as well as radio bandwidth in order to generate and process these signaling messages. Also, interference is created, potentially affecting the performance of other cells. This processing and signaling overhead is particularly burdensome and may not even be necessary, which is the case if a UE has already been allocated a semi-persistent radio resource in the uplink for a particular data flow. As explained in the background, one non-limiting example where semi-persistent resources are often established are for Voice over IP (VoIP) data flows. The technology in this application provides a way in which data of a certain priority or type, like VoIP data, may be handled differently than another priority or type of data with respect to sending scheduling requests to the base station.

Figure 3:
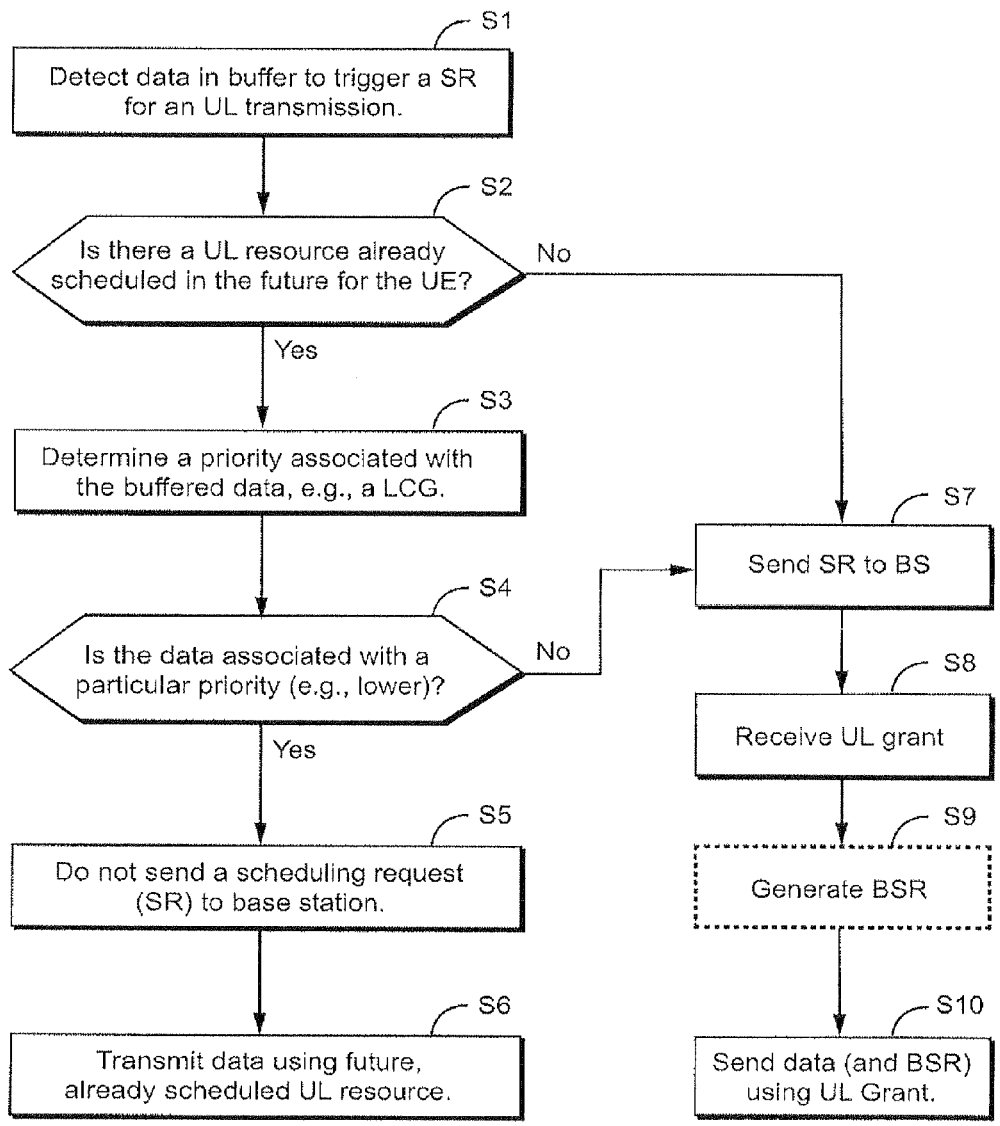
FIG. 3 is a flow chart showing non-limiting example procedures for use in a wireless terminal related to uplink resource scheduling and usage.

FIG. 3 is a flowchart showing non-limiting example procedures for use in a wireless terminal related to this uplink resource scheduling and usage technology. Initially in step S1, the wireless terminal detects data in its buffer which typically would trigger a scheduling request for an uplink transmission. But before that can happen, a decision is made whether there is an uplink resource already scheduled in the future for the wireless terminal to use for transmitting this data in the buffer (step S2), e.g., a semi-persistent resource is established for the wireless terminal data flow. If not, a scheduling request (SR) is sent to the base station (step S7). The wireless terminal waits to receive an uplink grant from the base station (step S8), and after receiving same, may generate a buffer status report (BSR) (step S9). The wireless terminal sends the data to the base station, and possibly a BSR if one was generated, using the uplink grant (step S10).

On the other hand, if an uplink resource is already scheduled for the wireless terminal, the wireless terminal determines a priority or a type associated with the buffered data (step S3). In an LTE type system, one non-limiting example of determining the data priority or type would be to determine the logical channel group (LCG) associated with the buffered data. The wireless terminal then determines whether the data in the buffer is associated with a particular priority or type (step S4). In this non-limiting example, the particular priority or type might be a lower priority or a priority associated with a particular category of data such as VoIP data. If that is the case, then the wireless terminal decides not to send a scheduling request to base station (step S5) and simply transmits the data using a future, already-scheduled uplink resource (step S6). Otherwise, if the data is associated with some other priority, e.g., a higher priority, or some other type of data, the wireless terminal sends a scheduling request to the base station (step S7) and follows the procedures outlined in steps S8 and S10 and optionally also step S9.

Figure 4:
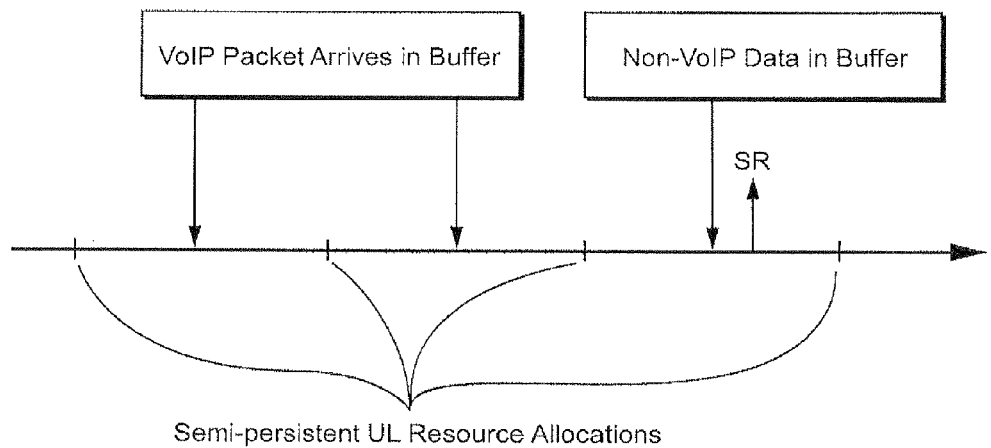
FIG. 4 illustrates an example of semi-persistent uplink resource allocations for VoIP and how VoIP and non-VoIP data are handled with respect to scheduling requests.

A non-limiting example is illustrated in FIG. 4 in which semi-persistent uplink resource allocations are provided for a VoIP data flow as indicated by the vertical hash marks along the timeline. Each time interval is referred to as a transmission time period. As indicated, a first VoIP packet arrives in the wireless terminal buffer and is transmitted using the next semi-persistent uplink resource allocation. Another VoIP packet arrives in the buffer and is transmitted using the next semi-persistent uplink resource. But in the next transmission time period, non-VoIP data is received in the wireless terminal's buffer. In this case, the wireless terminal does not wait to send the non-VoIP data at the next semi-persistent uplink resource allocation, but instead, generates a scheduling request (SR) and sends it to the base station in the hope of obtaining an uplink grant in a relatively short time period so that the non-VoIP data can be sent to the base station without having to wait and/or use the semi-persistent uplink resource allocation that is next scheduled. Not only does this allow the non-VoIP data to be sent perhaps more quickly, it also allows a VoIP packet to be transmitted using the next semi-persistent uplink resource rather than being delayed until the next transmission time period.

Figure 5:
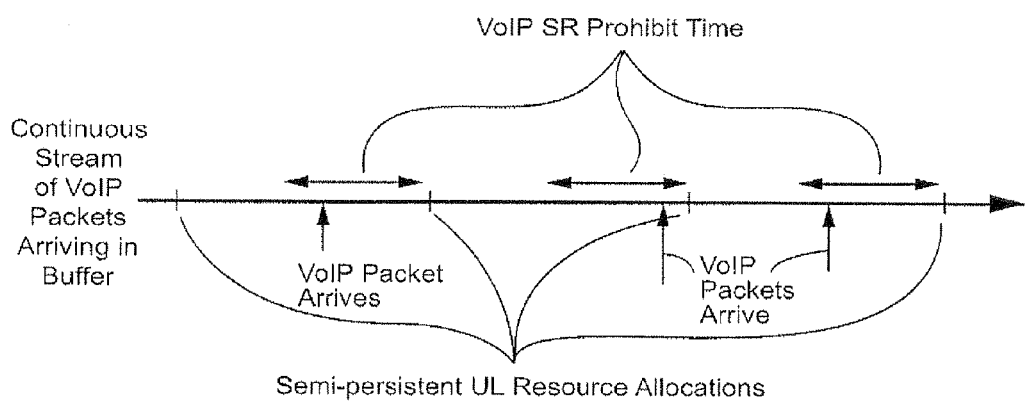
FIG. 5 illustrates an example of a continuous stream of VoIP packets arriving in the terminal's transmit buffer when semi-persistent uplink resource allocations for VoIP packets have been allocated for this terminal along with a VoIP SR prohibit time period used in each transmission time period.

Another non-limiting example embodiment employs a scheduling request prohibit timer to enable a margin between the arrival of the data and a next semi-persistently scheduled resource. FIG. 5 illustrates a continuous stream of VoIP packets associated with a VoIP data flow arriving in the wireless terminals transmit buffer when a semi-persistent uplink resource allocation for those packets is allocated. In addition, a VoIP scheduling request (SR) prohibit time period is used in each transmission time period between successive semi-persistent resource allocations. If a packet arrives in a transmission time period and the VoIP scheduling request prohibit time expires, then a scheduling request is generated by the wireless terminal and transmitted to the base station. Otherwise, a scheduling request is not transmitted for the packet in the buffer.

Such a prohibit timer is useful to prevent unnecessary scheduling requests in a VoIP type situation where an actively talking VoIP user has a semi-persistent resource allocation at regular intervals. Although it might be possible to attempt to match the incoming VoIP packets to the semi-persistent resource allocations on a milli-second basis, in which case the prohibit timer would not be as useful, it may not be realistic or advisable to rely on an alignment at this level of detail. If the VoIP packet arrives to the buffer before the semi-persistent resource allocation, a scheduling request is triggered (and wasted). If the VoIP packet arrives to the buffer later than the allocation, the UL resource is wasted and a scheduling request triggered. The scheduling request prohibit timer can prevent unnecessary scheduling request triggering related to granted UL resource allocations. FIG. 5 shows three VoIP packet arrivals during the VoIP SR prohibit time period, and as a result, no SR is generated.

For a silent VoIP user, transmitting only silent information data (SID) frames, the semi-persistent resource allocation is normally revoked by the network. Hence, the scheduling request prohibit timer is not restarted because there are no longer any future granted UL resource allocations. It is also possible to configure a semi-persistent resource for the periodic SID frame, in which case the prohibit timer may be used for the same reason as for an actively-speaking VoIP user.

The timer value should be set to avoid scheduling requests for VoIP frames, especially in situations with bundling of VoIP frames. But the timer value should not be set so long that it results in too long a delay for high priority data such as for example signaling radio bearer data.

Figure 6:
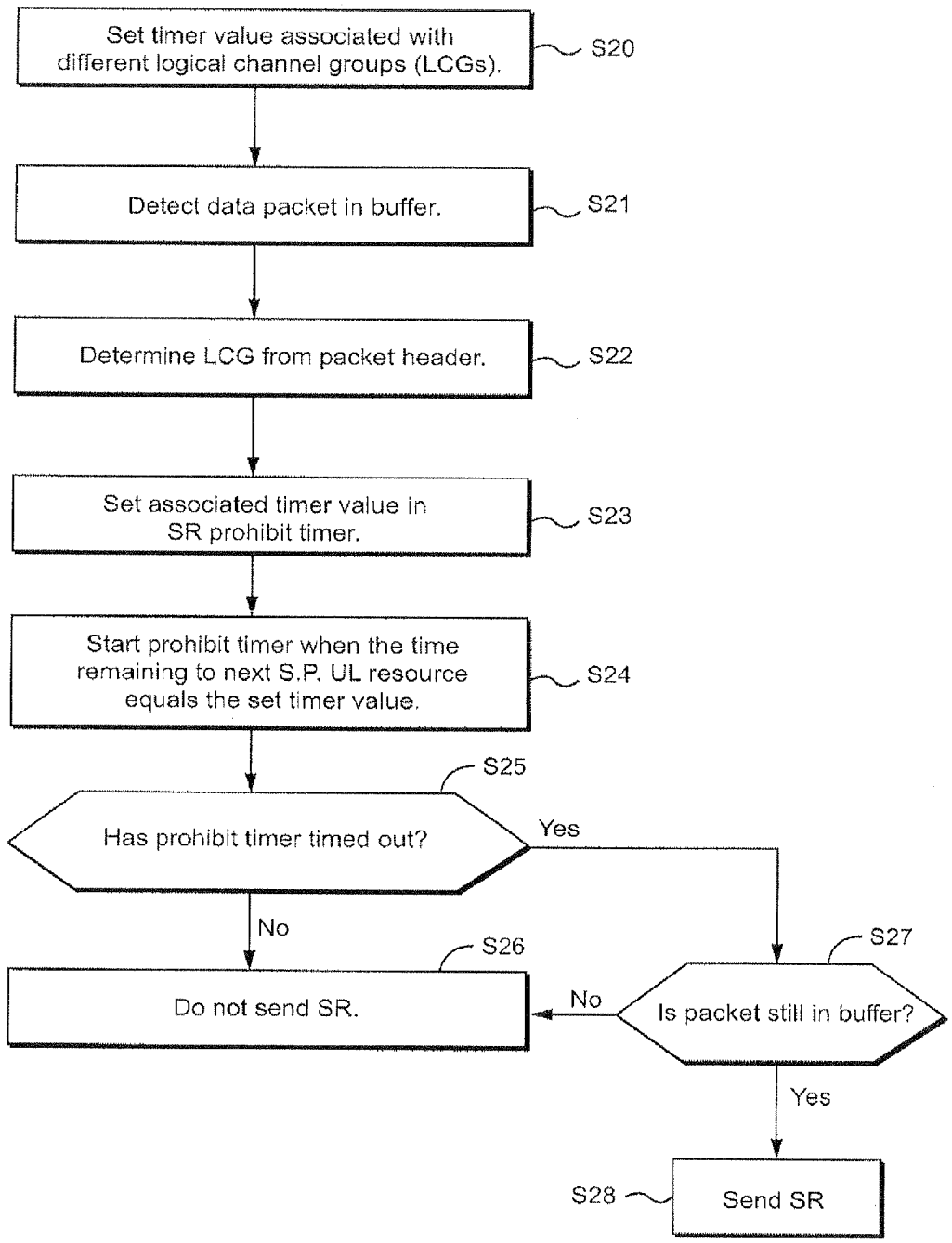
FIG. 6 is a flow chart showing non-limiting example procedures for using a SR prohibit timer.

FIG. 6 is a flowchart showing non-limiting example procedures for using a scheduling request prohibit timer. A timer value associated with all traffic flows or alternatively associated with a particular logical channel group or data flow priority is initially set (step S20), If desired, different timer values may be associated with different logical channel groups/priority types. The wireless terminal detects a data packet in its transmission buffer (step S21) and determines that packet's priority or logical channel group from information in the packet's header (step S22). Based on the determined logical channel group or priority of the packet, the wireless terminal sets the associated timer value in the scheduling request (SR) prohibit timer (step S23). That prohibit timer is started when the time remaining to the next semi-persistent uplink resource for this data flow equals the set timer value (step S24). The wireless terminal then decides whether the prohibit tuner has timed out (step S25). If not, a scheduling request for this data packet is not sent to the base station (step S26). On the other hand, if the prohibit timer has timed-out, the wireless terminal decides whether the packet is still in the buffer (step S27). If not, it has likely been sent with a semi-persistent uplink resource, and a scheduling request is not sent. On the other hand, if the packet is still in the buffer, a scheduling request is sent to the base station (step S28).

Figure 7:
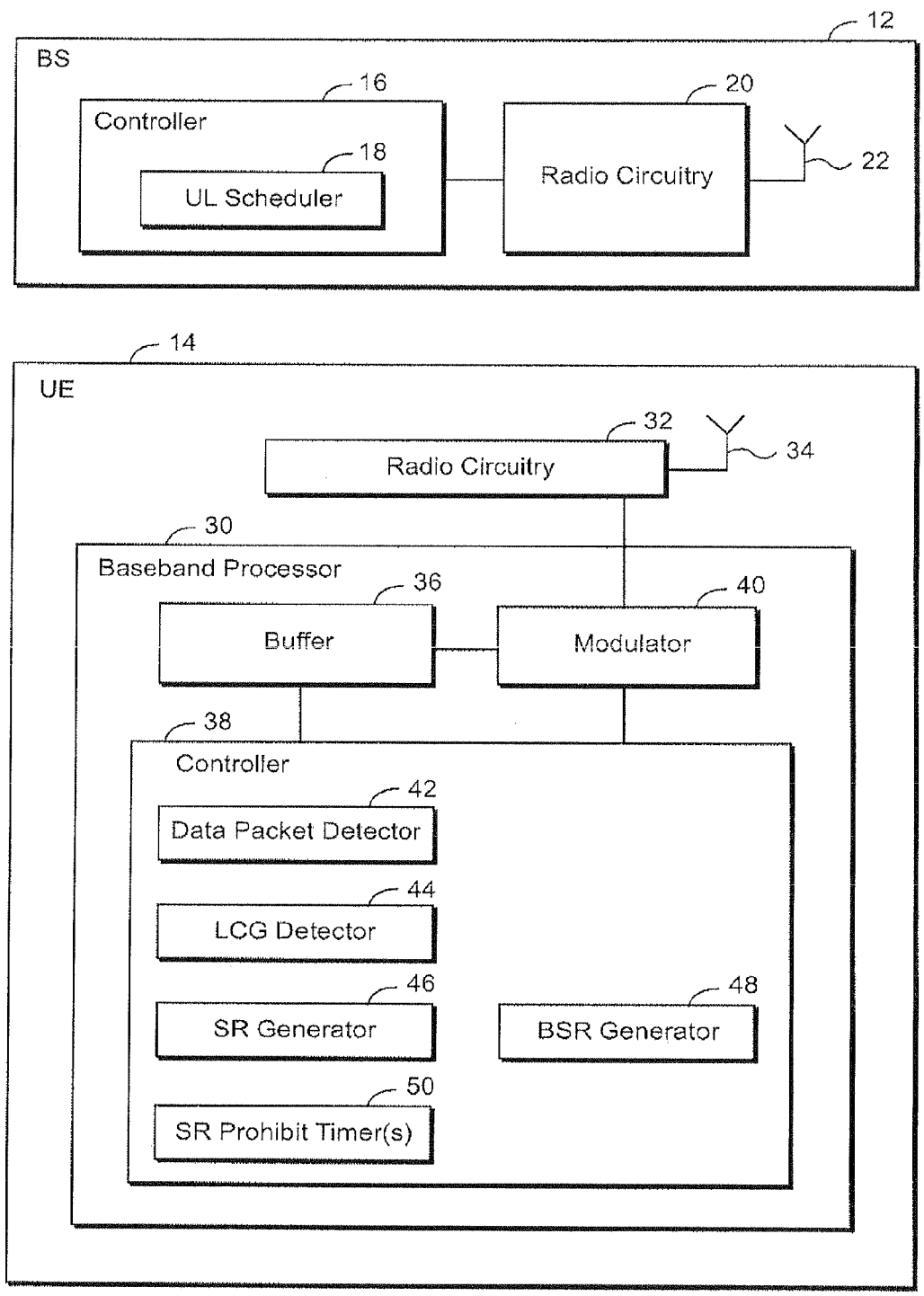
FIG. 7 is a non-limiting, example function block diagram illustrating a portion of a wireless terminal and a base station.

FIG. 7 is a non-limiting example function block diagram illustrating a portion of a wireless terminal 14 and a base station 12 that may be used for implementing the technology described above. The base station 12 includes a controller 16 coupled to radio circuitry 20 and an antenna 22. The radio circuitry 20 includes one or more radio transceivers along with appropriate baseband processing circuitry. The controller 16 includes among other things an uplink scheduler 18 for receiving uplink scheduling requests and generating appropriate scheduling grants.

The wireless terminal or UE 14 includes a baseband processor 30 coupled to radio transceiving circuitry 32 and an antenna 34. The baseband processor 30 includes a data transmission buffer 36 that is coupled to a modulator 40 which modulates the buffered data packets before providing them to the radio circuitry block 32. The buffer 36 and the modulator 40 are coupled to a controller 38 which includes a data packet detector 42, a logical channel group (LCG) detector 44, a scheduling request (SR) generator 46, a buffer status report (BSR) generator 48, and a scheduling request (SR) prohibit timer or timers 50. The data packet detector 42 detects the presence of data packets in the buffer 36, and the LCG detector 44 detects the priority or logical channel group of each of the buffered packets by examining each packet's header, A scheduling request (SR) prohibit timer 50 is set with an appropriate associated value for the detected LCG group and is started when the associated packet is detected in the buffer by the data packet detector 42. The prohibit timer might also be started in relation to a granted UL resource. In such case, the prohibit timer should, if correctly configured, prevent unnecessary scheduling requests during the time preceding the UL resource allocation. If the prohibit timer times out and the corresponding data packet is still in the buffer 36, i.e., the triggering condition of the scheduling request is still fulfilled, the scheduling request generator 46 generates a scheduling request and provides it to the modulator 40 along with a buffer status report (if desired) generated by the BSR generator 48.

Although various embodiments have been shown and described in detail, the claims are not limited to any particular embodiment or example. None of the above description should be read as implying that any particular element, step, range, or function is essential such that it must be included in the scope of the claims. The scope of patented subject matter is defined only by the claims. The extent of legal protection is defined by the words recited in the allowed claims and their equivalents. Reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. It is not necessary for a device or method to address each and every problem sought to be solved by the present technology, for it to be encompassed by the present claims. No claim is intended to invoke paragraph 6 of 35 USC .sctn.112 unless the words "means for" or "step for" are used. Furthermore, no embodiment, feature, component, or step in this specification is intended to be dedicated to the public regardless of whether the embodiment, feature, component, or step is recited in the claims.

What is claimed is:

1. A method relating to uplink communications from a wireless terminal to a network over a radio interface, the method implemented in the wireless terminal comprising:
    detecting data to be transmitted by the wireless terminal to the network to trigger a scheduling request to the network for an uplink transmission;
    determining a priority associated with the detected data;
    transmitting an uplink transmission scheduling request to the network if the determined priority is a first priority;
    delaying transmission or not transmitting an uplink transmission scheduling request to the network if the determined priority is a second different priority, wherein the second priority data corresponds to a data flow configured not to send a scheduling request;
    determining that a future uplink radio resource is scheduled for use by the wireless terminal,
    transmitting the data using the future uplink radio resource when the determined priority is the second priority;
    starting a timer having a predetermined timer value associated with the second priority when the time remaining to the future uplink radio resource equals the predetermined timer value;
    determining if the timer times out;
    if the timer times out prior to the data being transmitted, transmitting the uplink transmission scheduling request to the network.

2. The method of claim 1, wherein the first priority is higher than the second priority.

3. The method of claim 1, wherein the priority is associated with one or more of a logical channel, a logical channel group, a radio bearer, a quality of service, or a buffer status report associated with the data.

4. The method of claim 1, wherein the first priority data is delay-sensitive data and the second priority data is voice over IP (VoIP) data.

5. The method of claim 1, wherein the future uplink radio resource is semi-persistently scheduled at periodic time intervals, and wherein the timer value is the same as or less than the periodic time intervals.

6. The method of claim 1, further comprising:
starting a timer having a timer value associated with the first priority when the data with the first priority is detected, where the timer value associated with the first priority is less than the timer value associated with the second priority;
determining if the timer times out;
if the timer times out prior to the data being transmitted, transmitting the uplink transmission scheduling request to the network.

7. The method of claim 1, wherein the wireless terminal stores data to be transmitted to the network in a buffer, the method further comprising:
detecting that the buffer is empty;
thereafter, detecting that the buffer has received data for transmission;
if the detected data is associated with the first priority, transmitting a scheduling request, generating a buffer status report, receiving an uplink scheduling grant from the network, and transmitting the data with the first priority and the buffer status report to the network; and
if the detected data is associated with the second priority, not transmitting a scheduling request, a buffer status report is not transmitted to the network until an uplink resource is available to transmit the detected data associated with the second priority.

8. Apparatus for use in a wireless terminal for communicating with a network over a radio interface, comprising:
radio circuitry for communicating with the network;
a processor, coupled with the radio circuitry, including:
a buffer that stores data;
a modulator coupled to the buffer; and
a controller arranged to:
detect data in the buffer to be transmitted by the wireless terminal to the network to trigger a scheduling request to the network for an uplink transmission;
determine a priority associated with the detected data;
generate an uplink transmission scheduling request to be provided to the modulator for transmission to the network if the determined priority is a first priority; and
delay transmission or prevent transmission of an uplink transmission scheduling request to the network if the determined priority is a second different priority,
wherein the second priority data corresponds to a data flow configured not to send a scheduling request;
wherein the controller includes a timer and is arranged to:
start the timer with a predetermined timer value when the time remaining to a future uplink radio resource equals the predetermined timer value;
determine if the timer times out; and
if the timer times out prior to the data being transmitted, initiate transmission of an uplink transmission scheduling request to the network.

9. The apparatus of claim 8, wherein the first priority is higher than the second priority.

10. The apparatus of claim 8, wherein the priority is associated with one or more of a logical channel, a logical channel group, a radio bearer, a quality of service, or a buffer status report associated with the data.

11. The apparatus of claim 8, wherein the first priority data is delay-sensitive data and the second priority data is voice over IP (VoIP) data.

12. The apparatus of claim 8, wherein the controller is arranged to:
determine that a future uplink radio resource is scheduled for use by the wireless terminal, and
initiate transmission of the data via the modulator and radio circuitry using the future uplink radio resource when the determined priority is the second priority.

13. The apparatus of claim 8, wherein the predetermined timer value is associated with all traffic flows.

14. The apparatus of claim 8, wherein the predetermined timer value is associated with a specific priority of the data to be transmitted.

15. The apparatus of claim 14, wherein the controller includes multiple timers for different priorities.

16. The apparatus of claim 8, wherein the future uplink radio resource is semi-persistently scheduled at periodic time intervals, and wherein the timer value is the same as or less than the periodic time intervals.

17. The apparatus of claim 8, wherein the controller is arranged to:
detect that the buffer is empty;
thereafter, detect that the buffer has received data for transmission;
transmit a scheduling request, generate a buffer status report, receive an uplink scheduling grant from the network, and initiate transmission of the data with the first priority and the buffer status report to the network if the detected data is associated with the first priority; and
not to transmit a scheduling request and not to transmit the buffer status report until an uplink resource is available to transmit the detected data associated with the second priority if the detected data is associated with the second priority.

18. A base station for use with the wireless terminal of claim 8, comprising an uplink transmissions scheduler coupled to radio communications circuitry, wherein the uplink transmissions scheduler is configured to receive and grant scheduling requests and receive data transmitted using an uplink grant.

19. A wireless terminal which communicates with a network over a radio interface, comprising:
radio circuitry for communicating with the network;
a controller configured to:
detect data to be transmitted by the wireless terminal to the network to trigger a scheduling request to the network for an uplink transmission;
determine a logical channel group (LCG) associated with the detected data;
transmit an uplink transmission scheduling request to the network if the determined logical channel group LCG is a first LCG; and
delay transmission or not transmitting an uplink transmission scheduling request to the network if the determined LCG is a second different LCG;
wherein the second LCG data corresponds to a data flow configured not to send a scheduling request.

* * * * *